(12) United States Patent
Lerenius

(10) Patent No.: US 7,582,840 B2
(45) Date of Patent: Sep. 1, 2009

(54) USER CONTROL INTERFACE

(75) Inventor: Jacob Lerenius, Stockholm (SE)

(73) Assignee: Sony Ericsson Mobile Communications AB, Lund (SE)

( * ) Notice: Subject to any disclaimer, the term of this patent is extended or adjusted under 35 U.S.C. 154(b) by 91 days.

(21) Appl. No.: 11/828,470

(22) Filed: Jul. 26, 2007

(65) Prior Publication Data

US 2009/0026053 A1    Jan. 29, 2009

(51) Int. Cl.
   *H01H 9/00* (2006.01)
(52) U.S. Cl. .................... 200/314; 200/310
(58) Field of Classification Search .......... 200/310–345
   See application file for complete search history.

(56) References Cited

U.S. PATENT DOCUMENTS

| | | | |
|---|---|---|---|
| 6,704,004 B1 * | 3/2004 | Ostergård et al. | 345/170 |
| 6,800,819 B2 * | 10/2004 | Sato et al. | 200/5 R |
| 7,090,368 B2 * | 8/2006 | Oross et al. | 362/84 |
| 7,172,303 B2 * | 2/2007 | Shipman et al. | 362/29 |
| 7,187,364 B2 * | 3/2007 | Duarte et al. | 345/168 |
| 7,193,535 B2 * | 3/2007 | Shipman | 341/31 |
| 7,193,536 B2 * | 3/2007 | Shipman | 341/31 |
| 7,235,752 B1 * | 6/2007 | Chen et al. | 200/310 |
| 7,283,066 B2 * | 10/2007 | Shipman | 341/22 |
| 7,379,054 B2 * | 5/2008 | Lee | 345/173 |
| 7,441,913 B2 * | 10/2008 | Bayersdorfer | 362/29 |
| 7,441,931 B2 * | 10/2008 | Bayersdorfer et al. | 362/489 |
| 2004/0136175 A1 | 7/2004 | Lewis et al. | |
| 2007/0002019 A1 | 1/2007 | Lane et al. | |
| 2007/0152983 A1 | 7/2007 | McKillop et al. | |

FOREIGN PATENT DOCUMENTS

| | | |
|---|---|---|
| EP | 1 205 526 A | 5/2002 |
| EP | 1 662 755 A | 5/2006 |
| WO | WO 91/18265 A | 11/1991 |
| WO | WO 2005/114369 A | 12/2005 |

OTHER PUBLICATIONS

International Search Report for corresponding Application No. PCT/EP2008/050631 dated May 5, 2008.
Written Opinion for corresponding Application No. PCT/EP2008/050631 dated May 5, 2008.

* cited by examiner

*Primary Examiner*—Michael A Friedhofer
*Assistant Examiner*—Lisa N Klaus
(74) *Attorney, Agent, or Firm*—Renner, Otto, Boisselle & Sklar, LLP

(57) ABSTRACT

The invention relates to a user control interface comprising a plurality of illuminated symbols such as letters, digits and similar characters being arranged for facilitating input commands from a user and being disposed at a defined area forming part of a top layer facing a user during operation. The user control interface according to the invention comprises a support structure comprising at least one light source emitting light generally in the ultraviolet range in a direction towards said top layer, wherein said symbols are of more than one color, each color being provided by means of fluorescent material arranged in said top layer in a design corresponding to said symbols.

8 Claims, 4 Drawing Sheets

USER CONTROL INTERFACE

FIELD OF THE INVENTION

The present invention relates to a user control interface comprising a plurality of illuminated symbols such as letters, digits and similar characters being arranged for facilitating input commands from a user. The symbols are arranged at a defined area which can be constituted, for example, by a top surface of a touch panel arrangement or a key pad.

BACKGROUND

Today, there exist many types of electronic devices such as mobile telephones, media players, GPS modules, palmtop computers, cameras etc. Such devices comprise a user control interface having an output device, for example in the form of a display for presenting visual information such as letters, digits and also graphics and symbols related to the operation of the device in question. For example, such an output device can be a liquid crystal display. The user control interface normally also comprises an input device for manually inputting commands or making selections related to the operation of the device.

An input device for a user control interface can for example be constituted by a touch panel arrangement, which according to prior art can be in the form of a resistive touch panel. Such an arrangement is common today in mobile telephones and similar handheld devices.

According to known technology, a resistive touch panel can be based on a design comprising two conductive layers which are arranged with an air gap between the layers. One of the layers constitutes a top layer upon which the user may press with a finger or a stylus pen at a certain position which corresponds to a predetermined input command. The conductive layers are furthermore arranged so that they come into contact with each other when the user presses upon the top layer. By feeding suitable voltages to the two layers, the position of the input command can be detected.

The touch panel arrangement is normally provided with a thin top layer having printed or painted patterns defining visible letters, digits and other symbols, the purpose of which is to allow the user to make input commands during operation of the control interface.

Furthermore, it is common practice to provide a user control interface with means for illumination of the letters, digits and symbols which are to be used. Such means for illumination is normally arranged as a backlight arrangement. In the field of mobile telephones, for example, backlights are often implemented using light emitting diodes (LEDs) or electroluminiscent (EL) films.

This means that a complete touch panel arrangement with backlight devices can be designed as a multi-layer structure with a first layer in the form of a support layer for carrying one or more light sources for providing the backlight. Such a light source can for example be a blue LED which is encapsulated in epoxy material with fluorescent material so as to emit a white light. The white light is directed through a window in a further layer in the multi-layer structure, wherein the further layer can be in the form of a resistive touch panel, and further toward a top layer being designed as a mask layer with a design defining symbols such as letters, digits and other signs and characters. In this manner, the symbols provided in the top layer can be illuminated by means of the backlight.

In order to provide a suitable colour for the symbols in the top layer, a filter can be positioned between the light emitting diode in the support layer and the symbols provided in the top layer. In this manner, the white light from the light emitting diode can be transformed into a suitable colour.

In today's market for mobile telephones and similar portable and handheld terminals, there is a growing demand for increasing possibilities of attractive and flexible design. For example, there is a demand for providing a user control interface with multi-coloured symbols. As an example related to mobile telephones, it is regarded as attractive for the user if the top layer of a user control terminal is designed with different colours for different symbols. Implementing such a multi-coloured design could be seen as an advantage as regards the design and usefulness of the user control interface.

In order to achieve more than one colour using a single light emitting diode as mentioned, the light emitting diode would have to be arranged to emit all the necessary colours mentioned. A light emitting diode arranged for emitting white light could then be used. If, as an example, a touch panel is to be designed with a first letter being red and a second letter being green, it would be necessary to filter the white light through two filters, i.e. a first filter for filtering the white light to red at the position where the first letter is located, and a second filter for filtering the white light to green at the position where the second letter is located on the panel.

Although this previously known solution is acceptable as regards the design, visual appearance and illumination of the user control interface, it has some drawbacks. Firstly, the fact that two different filters are used in order to filter the white light into two different colours means that the white light will be attenuated to a relatively high degree. This means that, in order to provide an acceptable light intensity, a relatively high energy-consumption of the illumination means would be needed. This is a disadvantage in the field of handheld terminals such as mobile telephones where the available battery operating time is an important factor.

A further disadvantage also relates to the fact that, when filters are used, much of the light intensity is attenuated in the filter. The emitted light intensity from the light emitting diode must therefore be high and in the visible spectrum. This creates a problem with light leakage through various components of the user control interface.

Consequently, it can be summarized that new ways of illuminating user control interfaces are demanded by the market for mobile telephones, for example. However, prior technology for meeting this demand is associated with certain disadvantages, as explained above.

SUMMARY OF THE INVENTION

With the above and following description in mind, then, an aspect of some embodiments of the present invention is to provide a user control interface, suitably for handheld, portable terminals such as for example mobile telephones, in which the above-mentioned drawbacks can be overcome, and which can be used for providing multi-coloured designs and attractive light effects in such terminals.

By means of the invention, there is provided a user control interface comprising a plurality of illuminated symbols such as letters, digits and similar characters being arranged for facilitating input commands from a user and being disposed at a defined area forming part of a top layer facing a user during operation, said user control interface further comprising a support structure comprising at least one light source emitting light generally in the ultraviolet range in a direction towards said top layer, wherein said symbols are of more than one colour, each colour being provided by means of fluorescent material arranged in said top layer in a design corresponding to said symbols.

According to an embodiment of the invention, it comprises a touch panel layer positioned between the support layer and the top layer, said touch panel layer being arranged for detecting the position of said input commands by the user.

Suitably, the touch panel layer comprises a resistive touch panel.

According to an embodiment of the invention, it is constituted by a key pad comprising a switch structure positioned between the support layer and the top layer, said switch structure being arranged for detecting operation of the key pad by the user. In such case, said defined area suitably corresponds to a key forming part of said key pad.

According to an embodiment, the at least one light source is a UV or near UV light emitting diode being positioned on said support structure.

According to a further embodiment, said light source is constituted by a sidefire light source emitting light generally in a direction of an imaginary plane along which the support structure extends.

According to a further embodiment, said light source is constituted by a topfire light source emitting light generally perpendicular to an imaginary plane along which the support structure extends.

BRIEF DESCRIPTION OF THE DRAWINGS

The invention will now be described in more detail with reference to certain embodiments and to the attached drawings, in which.

DETAILED DESCRIPTION OF PREFERRED EMBODIMENTS

Figure 1:
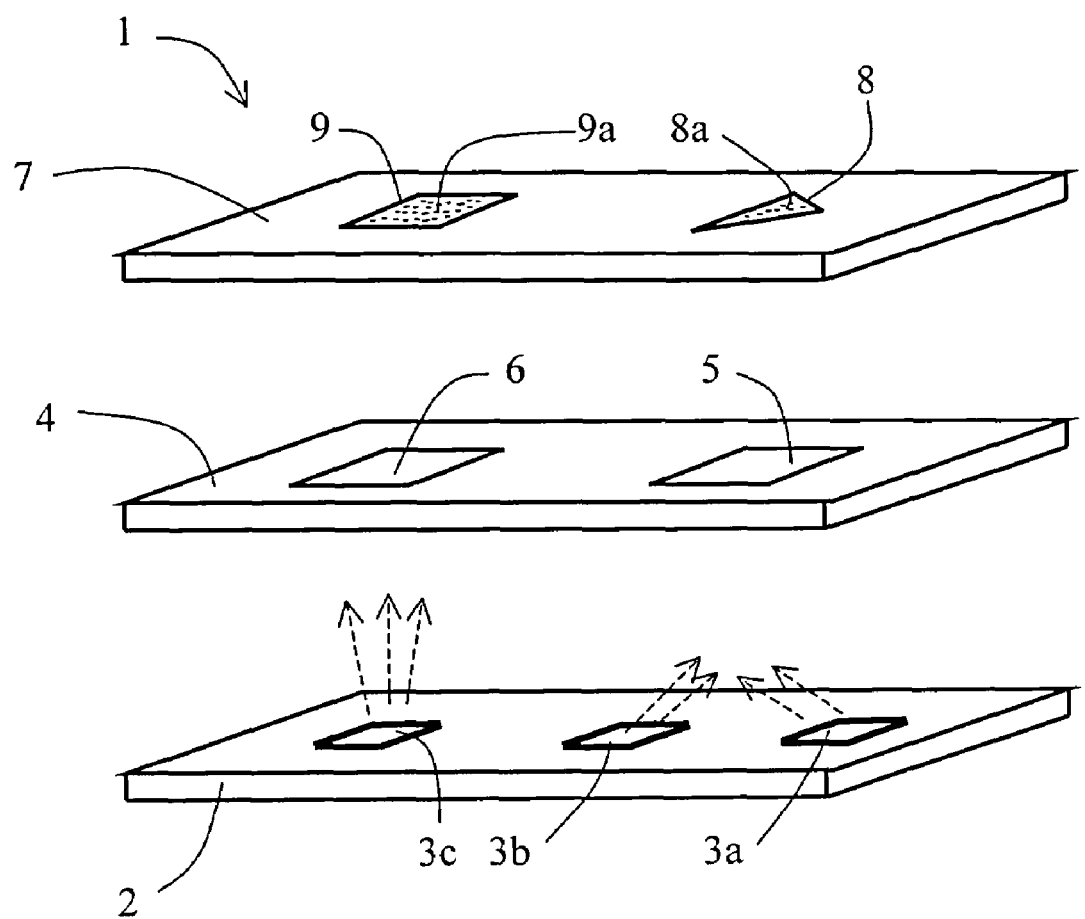
FIG. 1 shows in a perspective view a schematic diagram of a user control interface according to an embodiment of the invention, comprising a touch panel arrangement.

With reference to FIG. 1, there is shown a schematic and perspective view of a user control interface in the form of a touch panel arrangement 1 designed in accordance with an embodiment of the invention. The touch panel arrangement 1 is particularly suitable for use in handheld, portable mobile telephones. However, the invention is not limited to such use only but can in principle also be used in media players, cameras, GPS modules, palmtop computers, electronic game units, remote controls, pagers and similar devices.

The touch panel arrangement 1 is shown in FIG. 1 as a layered structure which, for reasons of clarity, is shown in a separated manner in the drawing. The touch panel 1 comprises a first layer in the form of a support layer 2 which acts as a support structure for a number of light sources 3a, 3b, 3c, i.e. a first light source 3a, a second light source 3b and a third light source 3c. According to the invention, the light sources 3a, 3b, 3c are constituted by LEDs, i.e. light emitting diodes, emitting light generally in the ultraviolet (UV) range. For example, the emitted light can be of a wavelength which is approximately 395 nm. Such ultraviolet light emitting diodes are previously known as such, and for this reason they are not described in detail here.

The light sources 3a, 3b, 3c are connected to a (not shown) control unit with an energy source and are arranged for transmitting UV, or near UV, light towards a second layer in the form of a touch panel layer 4. The light being emitted from each of the light sources 3a, 3b, 3c are shown in a principal manner in FIG. 1 as arrows extending from each one of the light sources 3a, 3b, 3c and towards the touch panel layer 4.

According to the embodiment shown in FIG. 1, the touch panel layer 4 is based on a touch panel of the resistive type. However, the invention is not limited to resistive touch panels only, but can alternatively be of other types such as a touch panel based on previously known capacitive sensors or surface acoustic wave sensors. A resistive touch panel is generally of a previously known type and for this reason it is not described in detail. It can be noted, however, that it is suitably designed as a layered arrangement with a first conductive layer and a second conductive layer with an air gap therebetween. Such a touch panel is also associated with a (not shown) voltage source and is arranged for detecting the position where a user presses with a finger or with a tool such as a stylus pen.

According to the embodiment shown in FIG. 1, the touch panel layer 4 is formed with two touch panel windows 5, 6, which are areas or sections of the touch panel layer 4 through which the light emitted from the light sources 3a, 3b, 3c may pass without being attenuated to any significant degree. More precisely, light passing through the first window 5 and the second window 6 in the touch panel layer 4 is further transmitted in a direction towards a further layer in the form of a top layer 7. The top layer 7 is an uppermost layer in the touch panel arrangement 1, i.e. it defines a top surface that faces the user during operation of the touch panel arrangement 1. The top layer 7 is provided with a printed or painted pattern or design defining certain symbols 8, 9 which are used as a guidance for the user when operating the touch panel arrangement 1. According to the embodiment, which is only to be regarded as an example, these symbols 8, 9 are constituted by an arrow 8 and a square 9, respectively. The arrow 8 may be used to indicate a "play" (or "start") function and the square 9 may be used to indicate a "stop" (or "stand by") function in the device in question. For this purpose, the arrow 8 should suitably be defined by a green colour and the square 9 should suitably be defined by a red colour.

It should be mentioned here that the symbols 8, 9 shown in FIG. 1 are just examples of symbols to be provided on the top layer 7. Other examples include letters, digits and other visual signs and characters which can be used as a guidance for a user when entering input commands of various types in the touch panel arrangement 1.

Furthermore, those sections of the top layer 7 where no light transmission through the top layer 7 is wanted are suitably coated with paint or some other type of coating in order to prevent light from shining through the materials where this is not intended.

As mentioned initially, there is a desire as regards today's handheld, portable devices that the user control interface be provided with a multi-coloured area of symbols. With reference to FIG. 1, this defined area can be said to be defined by the upper surface of the top layer 7, including the sections where the arrow 8 and the square 9 are located. According to the principles of the invention, the multi-coloured area is accomplished by providing the top layer 7 with fluorescent material of suitable type and design, so as to filter the white light provided by means of the light sources 3a, 3b, 3c to suitable colours. The fluorescent material is shown schematically in FIG. 1 as a "powder"-like substance 8a, 9a corresponding to the design of the two symbols 8, 9. Fluorescence can be provided by phosphor materials, which are previously known as such. The theory behind their operation is that the electrons in a phosphor material become excited when absorbing ultraviolet light. Visible light of a given colour is emitted when the excited electrons return to a ground state. Various colours of the emitted light can be obtained through a suitable choice of phosphor materials, each corresponding to a given colour.

According to the invention, the fluorescent material can be added as a thin layer on top of (or below) the top layer 7 or as a layer being integrated within the top layer 7. Furthermore, the fluorescent material can be in the form of a powder or a paint. A powder is suitable for forming a mixture with other materials such as elastomer materials. A paint is suitable for applying onto the top layer 7 according to a design corresponding to the symbols 8, 9 in question. In this latter case, the parts of the top layer 7 where the symbols 8, 9 are located must be of light-transmitting material. In any case, the fluorescent material is laid out in a visual design corresponding to the desired shape of the symbols 8, 9. The fluorescent material 8a, 9a will absorb the ultraviolet light from the light sources 3a, 3b, 3c so as to emit visible light of a given colour.

An advantage with the invention is that is provides a solution which gives the user new visual effects and provides a top surface 7 with multi-coloured symbols 8, 9. In particular, such a visual design can be provided with a relatively low energy-consumption as compared to previously known solutions involving multiple filters for providing the desired colours. This is due to the fact that the invention is arranged so that UV or near UV light is filtered through a fluorescent material. More precisely, one type of fluorescent material is used for filtering the UV light into each colour. The principle on which the invention is based is shown schematically in FIG. 2a, which shows two diagrams, the first of which indicates the intensity and wavelength of the light emitted by an UV light source such as the light sources 3a, 3b, 3c shown in FIG. 1. Since the light sources 3a, 3b, 3c emit light generally in the ultraviolet range, the wavelength is lower than the wavelength corresponding to blue light. The second diagram of FIG. 2a (i.e. to the right in FIG. 2a) shows the intensity and wavelength of the two symbols 8, 9 being green and red, respectively. The fluorescent material being associated with each symbol 8, 9 has been used to filter the UV light from the corresponding light sources 3a, 3b, 3c so as to produce a green symbol 8 and a red symbol 9 having a particular light intensity as indicated in the second diagram of FIG. 2a.

Figure 2A:
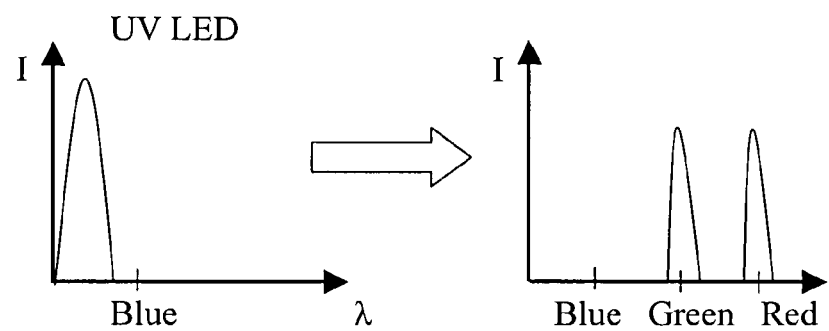
FIG. 2a shows the principal manner of operation of the present invention.
Figure 2B:
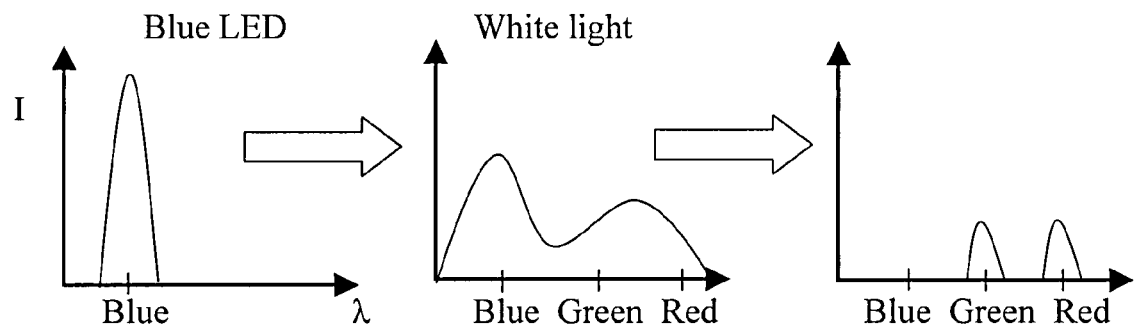
FIG. 2b shows, as a comparison with FIG. 2a, the manner of operation of a previously known arrangement for filtering light.

In contrast to FIG. 2a, it should be noted that FIG. 2b teaches a device for providing a multi-coloured user control interface according to prior art. As mentioned initially, a previously known arrangement for providing a corresponding interface with a green and a red symbol was based on the fact that white light is filtered through two different filters at the same time. In order to provide white light, it is known that light from a blue LED (see far left diagram in FIG. 2b) can be transmitted through an encapsulating epoxy material with suitable fluorescent material. In this manner, white light is produced (see middle diagram in FIG. 2b). The white light would then be filtered through two filters, i.e. a first filter for filtering the white light to red at the position where the first (red) symbol is located, and a second filter for filtering the white light to green at the position where the second (green) symbol is located on the panel. The fact that two different filters are used in order to filter the white light into two different colours means that the white light will be attenuated to a relatively high degree. This means that the green and red symbols will have a much lower intensity than the corresponding symbols according to the invention (see far right diagram in FIG. 2b). Consequently, the arrangement according to the invention is much more efficient as regards its energy-consumption than previously known devices.

Also, since the light sources 3a, 3b, 3c can be of relatively low power consumption and also since they emit light generally in the ultraviolet range, which is not visible to the human eye, the problem of light leakage known from previous technology can be greatly reduced or even eliminated.

By using relatively small fluorescent particles, small and detailed illuminated areas can be produced easily on the top layer 7. Also, different colours can be positioned near each other and can even be blended. Furthermore, the brightness of each illuminated area on the top layer 7 can be controlled individually by varying the thickness of the fluorescent material. This will allow an even illumination of the user control interface.

Figure 3:
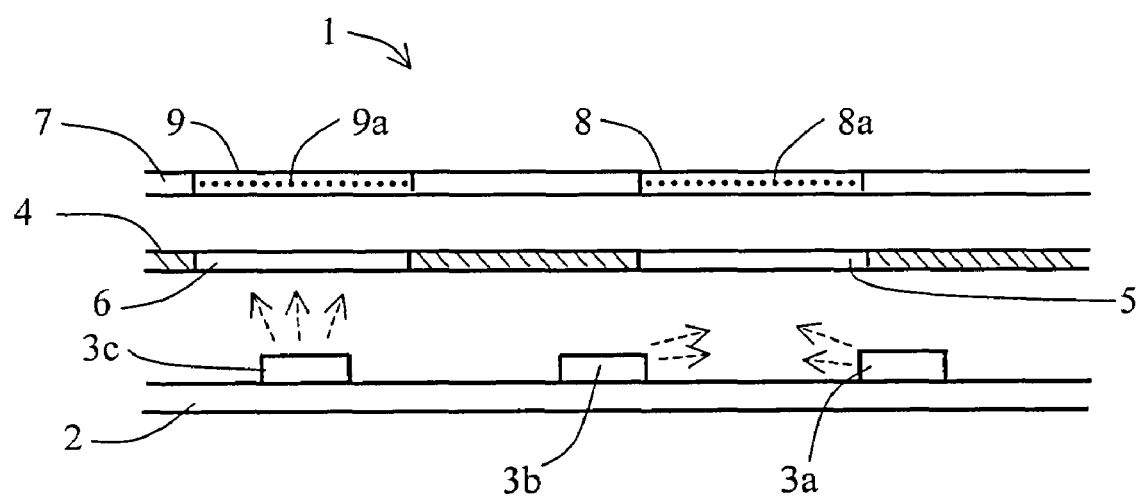
FIG. 3 shows a cross-sectional view of the arrangement according to FIG. 1.

FIG. 3 is a cross-sectional, principal view of the embodiment also shown in FIG. 1. Components which are the same in FIGS. 1 and 3 are indicated by means of the same reference numerals. With reference to FIG. 3, it can be noted that the three light sources 3a, 3b, 3c are used for providing light generally in the ultraviolet frequency range. The first light source 3a and the second light source 3b are, according to the embodiment, so-called "sidefire" light sources, i.e. emitting light at a given angle with respect to the plane being defined by the support layer 2. Normally, the "sidefire" light source emits light mainly in a sideways direction, i.e. generally along a direction of an imaginary plane along which the support layer 2 extends. This means that light being emitted toward the first window 5 is composed of ultraviolet light from the first light source 3a being incident at a given angle, and ultraviolet light from the second light source 3b, also being incident at a given angle. Furthermore, the third light source 3c is shown as a so-called "topfire" light source, i.e. emitting light generally perpendicularly with regard to the imaginary plane being defined by the support layer 2.

It should be apparent that, alternatively, the symbols 8, 9 could be illuminated by one "topfire" light source each or by means of two "sidefire" light sources each, or by means of any combination of "sidefire" and "topfire" light sources in a suitable set-up. Consequently, the invention is not limited to the design actually shown in FIG. 3.

According to the embodiment of FIG. 3, the light emitted from the first light source 3a and the second light source 3b is guided through the first window 5 and then toward the first symbol 8. Due to the fact that the first symbol 8 comprises a fluorescent material 8a, the first symbol 8 can be viewed as being illuminated with a certain colour. Furthermore, the light emitted from the third light source 3c is guided through the second window 6 and then toward the second symbol 9. Due to the fact that the second symbol 9 comprises a fluorescent material 9a, the second symbol 9 is viewed as being illuminated with a certain colour. In the example mentioned above, the first symbol 8 can be green and the second symbol 9 can be red.

Also, the fluorescent material 8a, 9a is shown in FIG. 3 as being embedded or integrated within the material making up the symbols 8, 9. However, the fluourescent material can alternatively be provided on top of the top layer 7 or on the underside of said top layer 7. In such case, the fluorescent material is suitably applied as a printed or painted layer.

Figure 4:
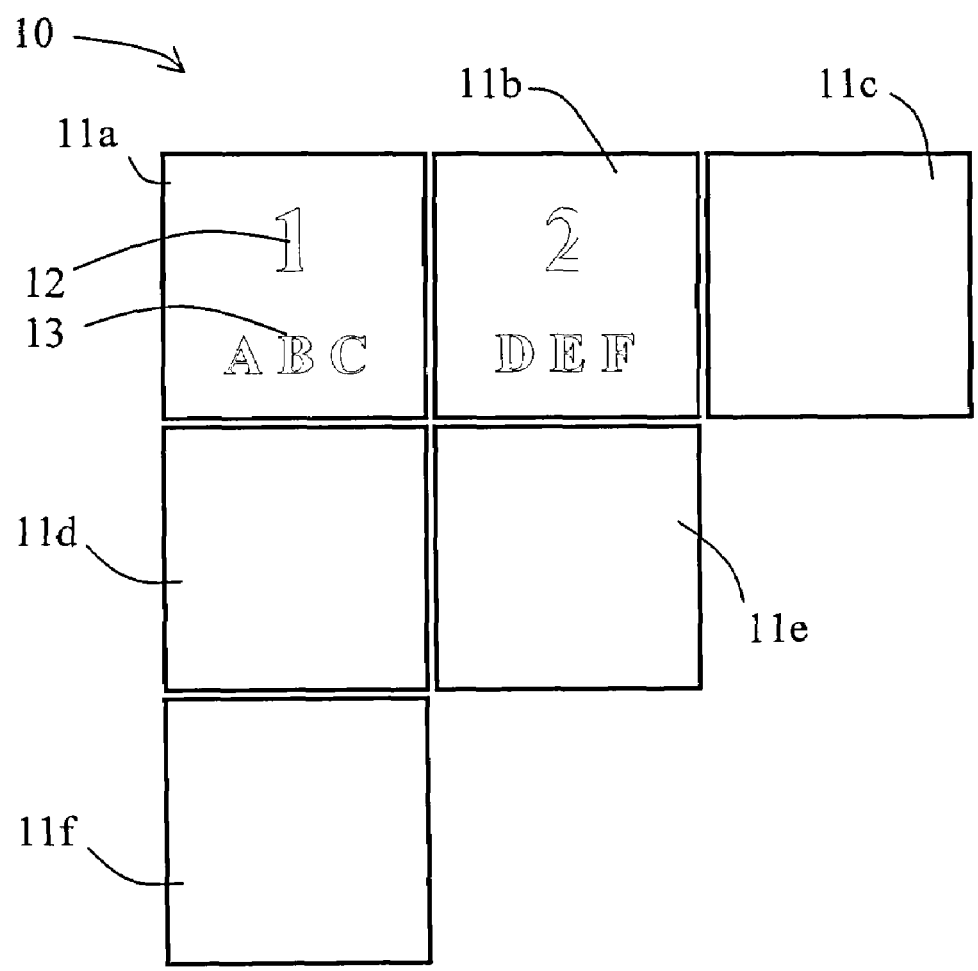
FIG. 4 shows an alternative embodiment of the invention.

With reference to FIG. 4, it should be noted that another example of a known user control interface is a key pad 11, i.e. a set of keys 11a, 11b, 11c, 11d, 11e, 11f arranged for operating, for example, a mobile telephone. FIG. 4 only shows a part of the key pad 11, with six different keys.

The first key 11a shown in FIG. 4 comprises a design with a set of letters, digits and other characters and symbols. For example, a first symbol 12 in the form of the digit "1", and a second symbol 13—or rather a set of symbols—in the form of the letters "A B C", are provided on the top surface layer of the first key 11a. Furthermore, the first key 11a is designed in order to transmit light generated by a backlight arrangement generally according to the same principles as described above with reference to FIGS. 1 and 3. This means that the surface of the first key 11a forms a defined area of a top layer which is arranged with symbols. The top layer is positioned over a support structure with one or more light sources in the form of ultraviolet LEDs. Between the support structure and the top layer, there is provided a switch structure (not shown) which is previously known as such, i.e. a circuit for sensing operation of the key 11a and for inputting signals to a control unit depending on whether the first key 11a is pressed or not.

Also, by forming the symbols 12, 13 of FIG. 3 by means of fluorescent material in the manner described above, the symbols 12, 13 can be made multi-coloured, i.e. being of different colours. This means that the digit "1" may have a first colour and the letters "A B C" may be of another colour. It should also be apparent that the letters "A B C" may be a multi-coloured structure, i.e. they may be of two or three different colours.

The remaining keys 11b, 11c, 11d, 11e etc. of the key pad 11 are suitably designed according to the same principles as described above with reference to the first key 11a.

The invention is not limited to the embodiment described above, but may be modified without departing from the scope of the claims below. For example, the invention can suitably be used in portable, handheld terminals such as mobile telephones, but is not limited to this type of use only and can be used in generally any device comprising a user control interface using a backlight arrangement. Also, the user control interface may be in the form of a touch pad, a touch screen, a key pad, a keyboard or any similar device.

Finally, the invention can also be applied so that one given symbol is composed of sections of different colours, in the same manner as different symbols have different colours.

The invention claimed is:

1. A user control interface comprising a plurality of illuminated symbols such as letters, digits and similar characters being arranged for facilitating input commands from a user and being disposed at a defined area forming part of a top layer facing a user during operation, said user control interface further comprising a support structure comprising at least one light source emitting light generally in the ultraviolet range in a direction towards said top layer, wherein said symbols are of more than one colour, each colour being provided by means of fluorescent material arranged in said top layer in a design corresponding to said symbols.

2. The user control interface according to claim 1, further comprising a touch panel layer positioned between the support layer and the top layer, said touch panel layer being arranged for detecting the position of said input commands by the user.

3. The user control interface according to claim 2, wherein the touch panel layer comprises a resistive touch panel.

4. The user control interface according to claim 1, being constituted by a key pad comprising a switch structure positioned between the support layer and the top layer, said switch structure being arranged for detecting operation of the key pad by the user.

5. The user control interface according to claim 1, wherein said defined area corresponds to a key forming part of said key pad.

6. The user control interface according to claim 1, wherein said at least one light source is a UV or near UV light emitting diode being positioned on said support structure.

7. The user control interface according to claim 6, wherein said light source is constituted by a sidefire light source emitting light generally in a direction of an imaginary plane along which the support structure extends.

8. The user control interface according to claim 6, wherein said light source is constituted by a topfire light source emitting light generally perpendicular to an imaginary plane along which the support structure extends.

* * * * *